(12) United States Patent  (10) Patent No.: US 6,366,543 B2
Uemura et al.  (45) Date of Patent: *Apr. 2, 2002

(54) OPTICAL PICKUP FOR DISCRIMINATING BETWEEN AND READING DIFFERENT TYPES OF OPTICAL DISCS

(75) Inventors: Kamon Uemura, Tokyo; Kiyoshi Ohsato, Chiba; Akio Yamakawa, Kanagawa; Masamichi Utsumi, Chiba, all of (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/819,794

(22) Filed: Mar. 29, 2001

Related U.S. Application Data

(62) Division of application No. 08/661,459, filed on Jun. 11, 1996, now Pat. No. 6,222,803.

(30) Foreign Application Priority Data

Jun. 12, 1995 (JP) ............................................. 7-144714
Jun. 21, 1995 (JP) ............................................. 7-154399
Jun. 30, 1995 (JP) ............................................. 7-166637

(51) Int. Cl.$^7$ ............................................. G11B 7/095
(52) U.S. Cl. ............................. 369/44.29; 369/44.37; 369/44.41; 369/53.2; 369/112.24
(58) Field of Search .......................... 369/44.26, 44.29, 369/44.37, 44.41, 53.2, 53.22, 112.24, 112.26

(56) References Cited

U.S. PATENT DOCUMENTS 4,773,052 A   9/1988  Sugiura et al.
4,787,076 A * 11/1988  Deguchi et al. ..... 369/44.29 X
5,097,464 A *  3/1992  Nishiuchi et al.
5,235,581 A *  8/1993  Miyagawa et al.
5,708,636 A *  1/1998  Takahashi et al. ....... 369/44.41
6,222,803 B1 * 4/2001  Uemura et al. .......... 369/44.29

FOREIGN PATENT DOCUMENTS

EP    0 392 775       10/1990
EP    4 459 420       12/1991
EP    0 704 841        4/1996
EP    0712122     *   5/1996

* cited by examiner

Primary Examiner—W. R. Young
(74) Attorney, Agent, or Firm—Rader, Fishman & Grauer PLLC; Ronald P. Kananen

(57) ABSTRACT

An optical pickup including a light source for radiating a light beam, a diffraction element for separating a light beam radiated from the light source into at least three beams, namely a main beam and two side beams, an objective lens for converging the light beams separated by the diffraction element on a signal recording surface of the optical recording medium, a light receiving unit having a four-segment first light receiving portion for receiving the main beam reflected by the recording surface of the optical recording medium and second and third light receiving portions arranged on both sides of the first light receiving portion for receiving the side beams reflected by the recording surface of the optical recording medium, and a calculation unit for generating a first tracking signal based on respective outputs of the first light receiving portion and for generating a second tracking signal based on outputs of the second and third light receiving portions.

6 Claims, 13 Drawing Sheets

OPTICAL PICKUP FOR DISCRIMINATING BETWEEN AND READING DIFFERENT TYPES OF OPTICAL DISCS

This application is a division of application Ser. No. 08/661,459, filed Jun. 11, 1996, now U.S. Pat. No. 6,222,803.

BACKGROUND OF THE INVENTION

1. Field of the Invention

This invention relates to an optical pickup for recording and/or reproduction of an optical recording medium, a reproducing apparatus and a recording apparatus for an optical recording medium. More particularly, it relates to an apparatus capable of recording and/or reproducing plural sorts of optical discs different in track pitch by one and the same apparatus.

2. Description of the Related Art

Heretofore, in an apparatus for reproducing an optical disc, such as a compact disc, a three-beam method has used as a system for generating tracking error signals. This system splits a light beam radiated by a semiconductor laser element by a diffraction grating into three beams, namely a main beam and two side beams. The main beam is radiated on a recording track of an optical disc, while both side beams are radiated on the positions of the disc offset by one-fourth of a track to both sides of the recording track. The light beams radiated on the optical disc are reflected by the recording surface of the recording medium so as to be received by a photodetector. This photodetector is made up of a first photodetector portion for receiving both side beams. The tracking error signal is detected by finding the difference between the signals received and by the second and third photodetector portions.

Recently, an optical disc has been investigated in which data may be recorded to a high density for recording data of high precision, such as still pictures or moving pictures. With such an optical disc, it may be contemplated to set the track pitch to approximately 0.8 $\mu$m instead of to 1.6 $\mu$m conventionally used, or to form a recording layer of a narrower track pitch as multiple layers. The optical disc, recorded to a high density, is not limited to a replay-only type, but a rewritable optical disc, such as a phase change type disc, is also contemplated. Such a disc having a guide groove may also been envisaged as such rewritable optical disc.

However, it is difficult with an optical disc for high density recording to detect tracking error signals using the above-mentioned three-beam system. That is, since the track pitch is of a narrow width, registration of the side spots of the three spots radiated on the recording surface of the optical disc becomes difficult. Also, if the high-density recording layer is formed as multiple layers, a problem arises that an offset is produced in the tracking error signal due to leakage of the reflected light form the layer other than the layer being recorded or reproduced. In addition, if the rewritable optical disc is a phase change type disc, and recorded and unrecorded portions are produced on the disc, a noise is produced with the three-beam method due to difference in reflectance in the recorded and unrecorded portions, thus making it difficult to generate correct tracking error signals.

OBJECT AND SUMMARY OF THE INVENTION

In view of the above-depicted status of the art, it is an object of the present invention to provide an apparatus capable of performing selective recording and/or reproduction on or from plural sorts of optical discs, such as optical discs with different track pitches.

An optical pickup according to the present invention includes a light source for radiating a light beam, a diffraction element for separating a light beam radiated from the light source into at least three beams, namely a main bean and two side beams, an objective lens for converging the light beams separated by the diffraction element on a signal recording surface of the optical recording medium, a light receiving unit having a four-segment first light receiving portion for receiving the main beam reflected by the recording surface of the optical recording medium and second and third light receiving portions arranged on both sides of the first light receiving portion for receiving the side beams reflected by the recording surface of the optical recording medium, and a calculation unit for generating a first tracking signal based on respective outputs of the first light receiving portion and for generating a second tracking signal based on outputs of the second and third light receiving portions.

A tracking servo system in an optical disc recording and/or reproducing apparatus according to the present invention includes a light source for radiating a light beam, a diffraction element for separating a light beam radiated from the light source into at least three beams, namely a main beam and two side beams, an objective lens for converging the light beams separated by the diffraction element on a signal recording surface of the optical recording medium, a light receiving unit having a four-segment first light receiving portion for receiving the main beam reflected by the recording surface of the optical recording medium and second and third light receiving portions arranged on both sides of the first light receiving portion for receiving the side beams reflected by the recording surface of the optical recording medium, a calculation unit for finding a plurality of tracking error signals based on outputs of the first, second and third light receiving portions, a discrimination unit for discriminating the sorts of the optical discs, a switching unit for selecting one of the tracking error signals calculated by the calculation unit based on a signal from the discrimination unit, and a driving unit for driving an objective lens based on the tracking error signal selected by the switching means.

The discrimination unit discriminates between at least two sorts of the optical discs with different track pitches, and the signal processing unit is responsive to the results of discrimination to switch the calculation operations for obtaining a tracking error signal from a detection signal of the photodetector unit, so that at least two sorts of the optical disc can be reproduced by simplified adjustment operation.

DESCRIPTION OF THE PREFERRED EMBODIMENTS

Figure 1:
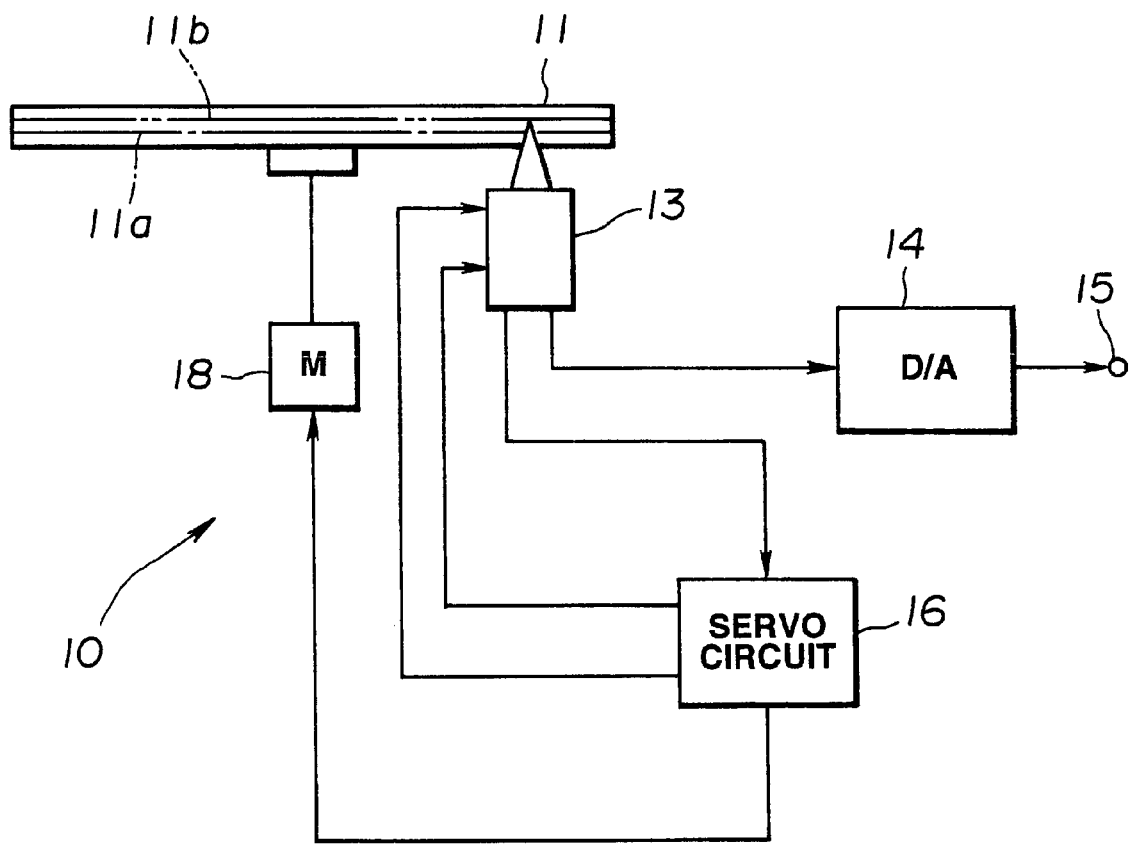
FIG. 1 illustrates a schematic structure of an optical disc recording and/or reproducing apparatus embodying the present invention.

Referring to the drawings, preferred embodiments of an optical pickup device according to the present invention will be explained in detail.

FIG. 1 schematically shows an optical disc reproducing apparatus according to the present invention.

An optical disc reproducing apparatus 10 is a so-called compatible optical disc reproducing apparatus for reading out and reproducing information signals from an optical disc having a track pitch of 1.6 μm and a substrate thickness of 1.2 μm, such as a compact disc, and a double-layer optical disc 11 having a track pitch of approximately 0.8 μm and having two information signal layers oriented in the same read-out direction.

An optical pickup device 13 radiates a laser light beam to these optical discs having different track pitches and different substrate thicknesses for reproducing information signals from tracks formed on the information signal layers.

Figure 2:
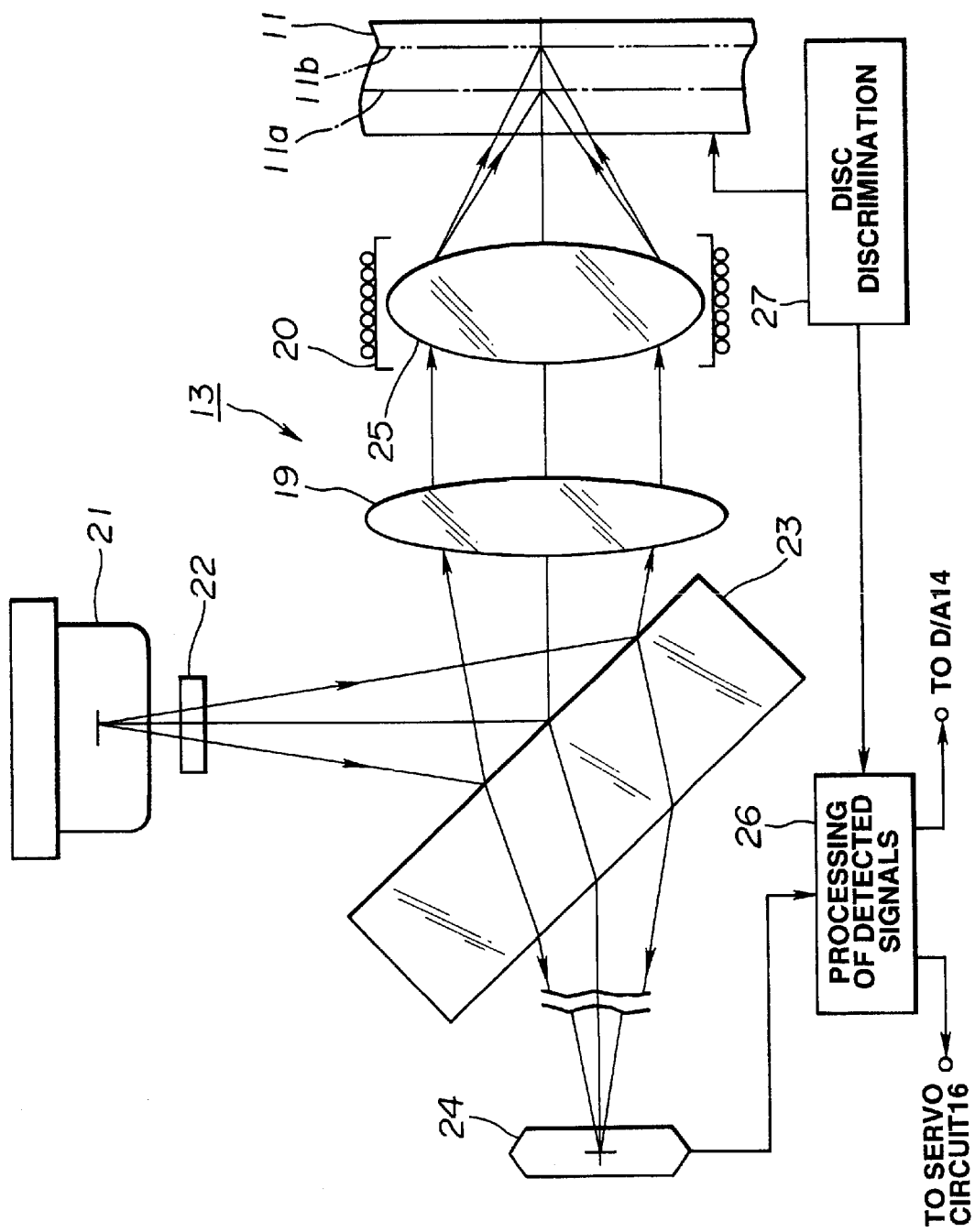
FIG. 2 illustrates a schematic structure of an optical pickup embodying the present invention.

Referring to FIG. 2, the optical pickup device 13 includes a light source 21 radiating a laser beam, such as a laser diode, and an objective lens 25 for focusing the laser beam on the information signal layers of plural sorts of optical discs having different track pitches, of which only the double-layer optical disc 11 is shown in FIG. 2. The double-layer optical disc 11 shown in FIG. 2 has a first information signal layer 11a and a second information signal layer 11b. The optical pickup device 13 also includes a photodetector 24 for receiving the reflected light form the optical disc for converting it into electrical signals, and a disc discrimination unit 27 for discriminating the sort of the optical disc. The optical pickup device 13 further includes a detection signal processor 26 responsive to the type of optical disc present as determined by the disc discrimination unit 27 to switch the calculation operations for calculating tracking error signals from the detected signals of the photodetector 24 for producing tracking error signals, in addition to a focusing error signal and main playback signals.

The tracking error signals and the focusing error signal, obtained by the detection signal processor 26, of the optical pickup device 13, are supplied to a servo circuit 16 of FIG. 1. The servo circuit 16, manages tracking control and servo control responsive to these signals. Specifically, a focusing driving signal is applied in the optical pickup unit 13 to a bi-axial mechanism 20 holding the objective lens 25 for driving the objective lens 25 in a direction into and out of contact with, for example, the double-layer optical disc 11 for managing tracking. A thread driving signal is generated by extracting low-frequency components of the tracking error signal for driving a thread mechanism for moving the optical pickup device 13 in its entirety radially of, for example, obtained by the detection signal processor 26, is processed with demodulation for EFM and CIRC decoding by a A/D converter 14 into an analog signal which is outputted at a n output terminal 15. The servo circuit 16 controls rotation of a spindle motor 18 based on clocks obtained from the main playback signals.

The detailed structure and operation of the optical pickup device 13 will now be explained. Referring to FIG. 2, a diffused laser beam, radiated by the optical source 21, is diffracted by a diffraction grating 22 and thereby separated into three beams, namely a 0 order beam and ±1 order beams. The laser beams, diffracted by the diffraction grating 22, are reflected by a beam splitter 23 and collimated by a collimator lens 19 so as to enter the objective lens 25. The objective lens 25 is tracking- and focusing-controlled by the bi-axial mechanism 20 for converging the laser beams on information signal layers of the optical disc, such as the first information signal recording layer 11a and the second information signal layers 11b of the double-layer optical disc 11 for forming three spots. The three reflected laser beams from the first information signal recording layer 11a and the second information signal layers 11b of the double-layer optical disc 11 reach a light receiving surface of the photo-detector 24 via objective lens 25 and beam splitter 23.

Figure 3:
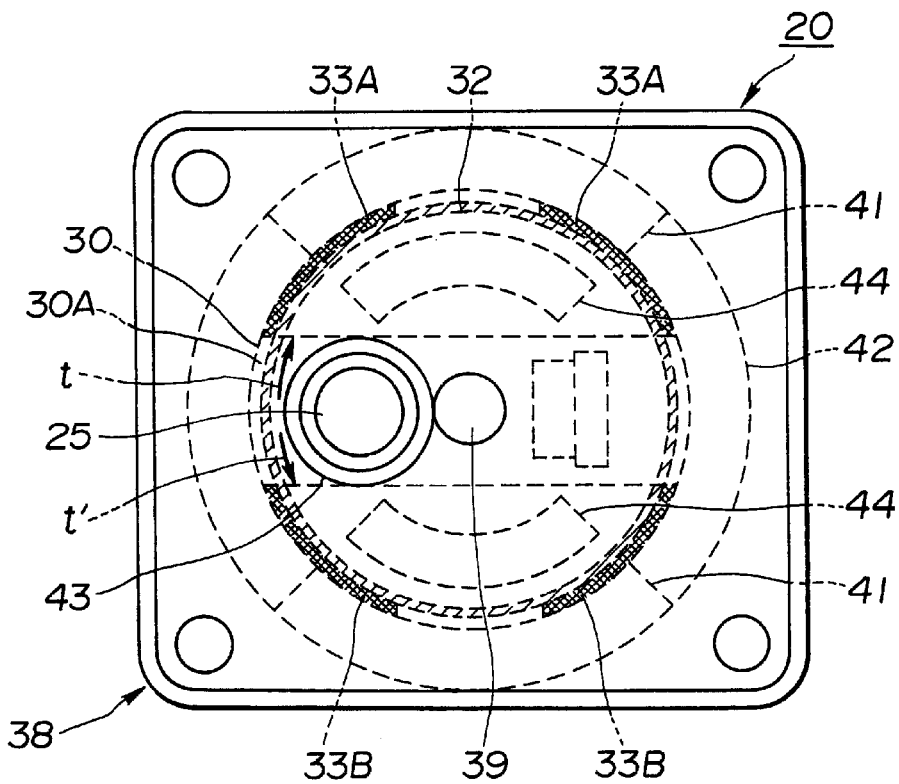
FIGS. 3 and 4 illustrate a bi-axial mechanism of an objective lens in the optical pickup.
Figure 4:
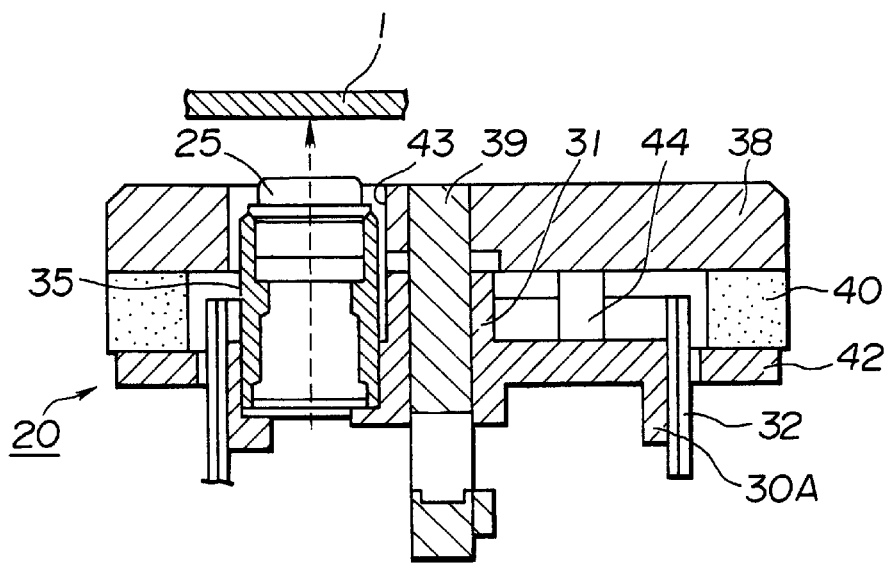

The bi-axial mechanism 20 is of an axial siding type as shown in FIGS. 3 and 4, wherein a movable part 30 is constituted by a bobbin 30A formed of a non-magnetic material. At a mid position of the bobbin 30A is formed an axially fitted tubular bearing 31. On the outer peripheral surface of the bobbin 30A is wound a focusing coil 32 for forming a right ring about the bearing 31. The focusing coil 32 is used for moving the movable part 30 in the focusing direction, that is in a direction perpendicular to the disc surface. On the surface of the focusing coil 32 are formed two sets of tracking coils 33A, 33B in tight contact with the focusing coil 32 for moving the movable part 30 in the tracking direction, that is along the radius of the disc. These tracking coils 33A, 33B are wound about an axis extending perpendicular to the winding axis of the focusing coil 32 so that four rings are formed on the outer peripheral surface of the bobbin 30A.

The mid portion of the bi-axial mechanism 20 is traversed by a supporting shaft 39. A stepped hole 43 is formed parallel to the center axis of the supporting shaft 39 in the bobbin 30A at an offset position with respect to the supporting shaft 39. Within this hole 43 is mounted a lens barrel 35 within which is secured the objective lens 25.

The movable part 30, thus constructed, has the supporting shaft 39 set upright at a mid portion of a stationary yoke 38 of a magnetic material guided and introduced into a center hole of the bearing 31, so that the movable part 30 is supported for sliding along and for rotation about the supporting shaft 39. On the lower surface of the stationary yoke 38 is secured an annular permanent magnet 40 in intimate contact therewith about the supporting shaft 39 as center. On the lower end face of the permanent magnet 40 is secured a first yoke 42 having a lug 41. On the stationary yoke 38 is protuberantly formed a second yoke 44 for facing the lug 41 of the first yoke 42 on the inner side of the bobbin 30A. The stationary yoke 38, permanent magnet 40, the first yoke 42 and the second yoke 44 make up a magnetic circuit. The focusing coil 32 and the tracking coils 33A, 33B are arranged in a magnetic gap defined between the first yoke 42 and the second yoke 44. The stationary yoke 38 has the hole 43 larger in diameter than the outer diameter of the lens barrel 35 held by the bobbin 30A. Into this hole 43 is guided and introduced an upper end of the lens barrel 35.

Figure 5:
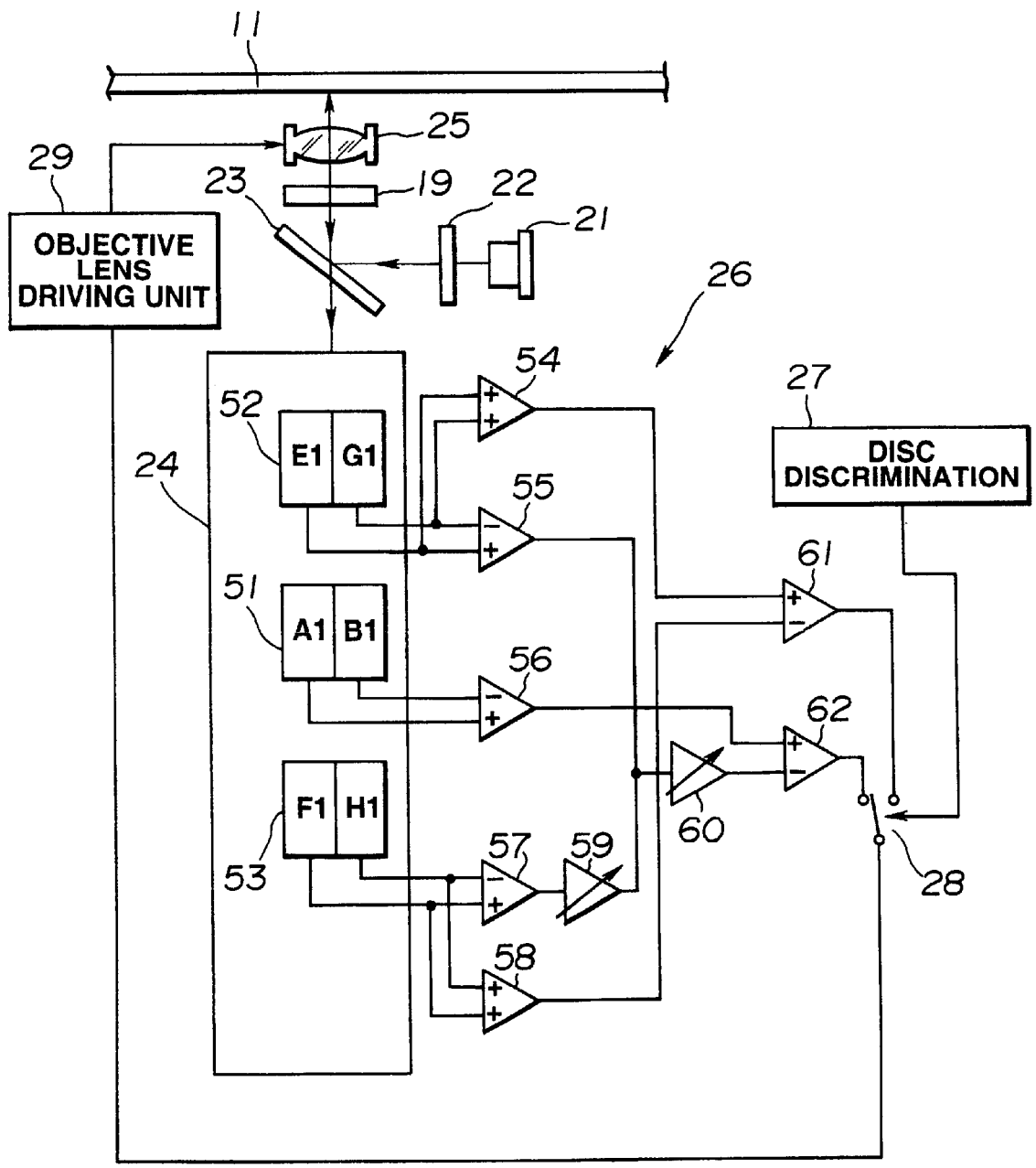
FIG. 5 illustrates a first embodiment of a tracking servo system according to the present invention.

FIGS. 5 and 6 show a first embodiment of tracking servo for reproducing plural discs having different track pitches.

With the present first embodiment of the optical disc recording and/or reproducing apparatus, it is possible to reproduce an optical disc having a substrate thickness of 1.2 mm and a track pitch of 1.6 μm, an optical disc having a substrate thickness of 1.2 mm and a track pitch of 0.8 μm and an optical disc having a substrate thickness of 0.6 mm and a track pitch of 0.8 μm. It is also possible to record a rewritable phase-change type optical disc having a substrate thickness of 0.6 mm and a track pitch of approximately 0.8 μm.

Referring to FIG. 5, the optical disc recording and/or reproducing apparatus of the first embodiment has a light receiver 24 for receiving the light beam radiated from the light source 21 and reflected from the signal surface of the optical disc 11 via the objective lens 25, collimator lens 19 and the beam splitter 23 after irradiation of the optical disc 11 via the diffraction gratin 22, beam splitter 23, collimator lens 19 and the objective lens 25, and a signal detector 26 for generating two sorts of tracking error signals based on a light volume detection signal from the receiver 24. The optical disc recording and/or reproducing apparatus also includes a disc discrimination unit 27 for discriminating the type of the optical discs recorded or reproduced, a changeover switch 28 for selecting the tracking error signals from the signal detector 26 and an objective lens driving unit 29 for driving the objective lens 25 based on the selected tracking error signal.

The light receiver 24 has first to third light receivers 51 to 53 for receiving the light beams split by the diffraction grating 22 into three portions and reflected by the optical disc 11. The first light receiver 51 receives the main beam (0-order light) of the three split light beams and is divided into at least two areas of A1 and B1. The second and third light receivers 52, 53 receive the two side beams (±1 order light beams) of the three split light beams and have two split portions each of which is divided into areas E1, G1 and F1, H1 respectively.

Of the outputs of the receivers 51 to 53, the outputs E1, G1 of the receiver 52 and the outputs F1, H1 of the receiver 53 are summed respectively at adders 54 and 58, outputs of which are supplied to a comparator 61 for generating a first tracking error signal. The outputs E1, G1 of the receiver 52 are supplied to a comparator 55, while the outputs F1, H1 of the receiver 53 are supplied to a comparator 57. A difference output of the comparator 55 and a difference output of the comparator 57 fed via a variable gain amplifier 59 are summed together and a resulting sum output is supplied further via a variable gain amplifier 60 to a comparator 62. A difference output of the comparator 62 gives a second tracking error signal.

Figure 6A:
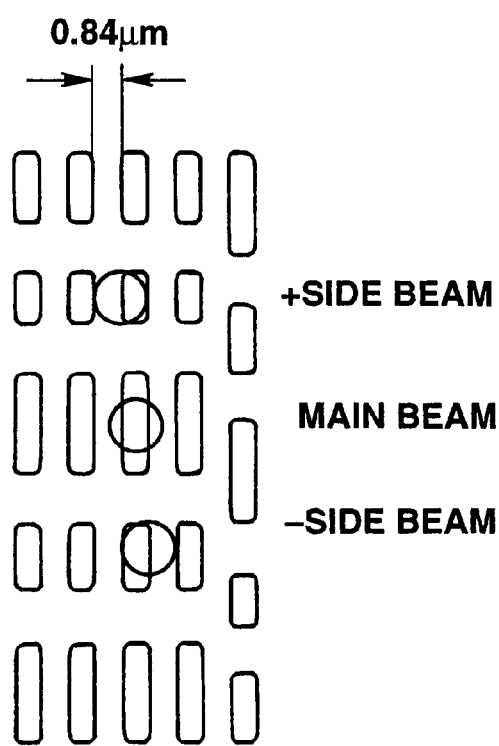
FIGS. 6A and 6B illustrate the state of radiation of three beams on signal pits of an optical disc.
Figure 6B:
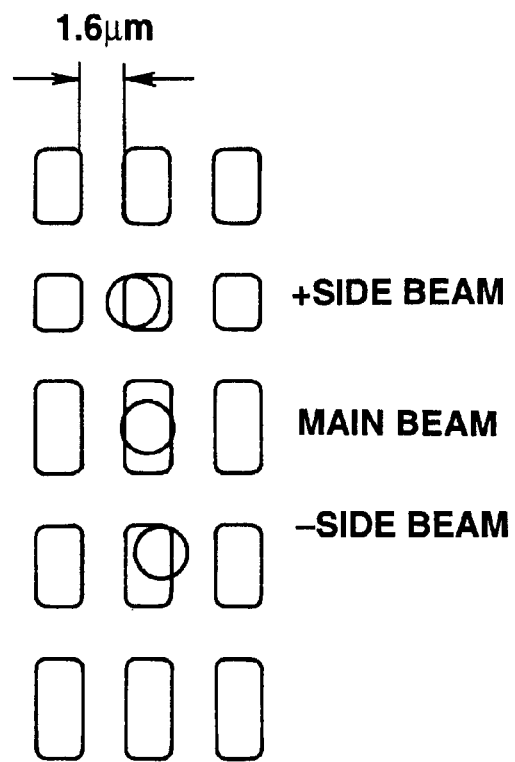

FIGS. 6A and 6B illustrate the state of irradiation of the discs of different track pitches with the three split light spots.

FIG. 6A illustrates an example of an optical disc having a track pitch of approximately 0.84 μm, in which side beams are illuminated at the positions offset by one-half the track pitch with respect to the main beam. FIG. 6B shows an example of an optical disc having a track pitch of 1.6 μm in which side beams are illuminated at the positions offset by one-fourth the track pitch with respect to the main beam. With the optical disc of FIG. 6A, since the track pitch is one-half that of the optical disc of FIG. 6B, offset due to optical axis deviation of the objective lens 25 of offset due to tilt of the optical disc are produced frequently.

If an optical disc is judged by the disc discrimination unit 27 to be an optical disc having a track pitch of 1.6 μm, a first tracking error signal, which is a differential output of the comparator 61, is selected. On the other hand, if an optical disc is judged by the disc discrimination unit 27 to be an optical disc having a track pitch of 0.8 μm, a second tracking error signal, which is a differential output of the comparator 62, is selected.

By generating the tracking error signals as described above, a three-beam method is applied to reproduction of a compact disc, while a differential push-pull method, removing unneeded offset, is applied to reproduction of a high recording density replay-only disc or a recording/reproducing disc. Thus, a compatible optical disc recording and/or reproducing apparatus may be realized by employing a common optical system and by simply switching the calculation operations.

Figure 7:
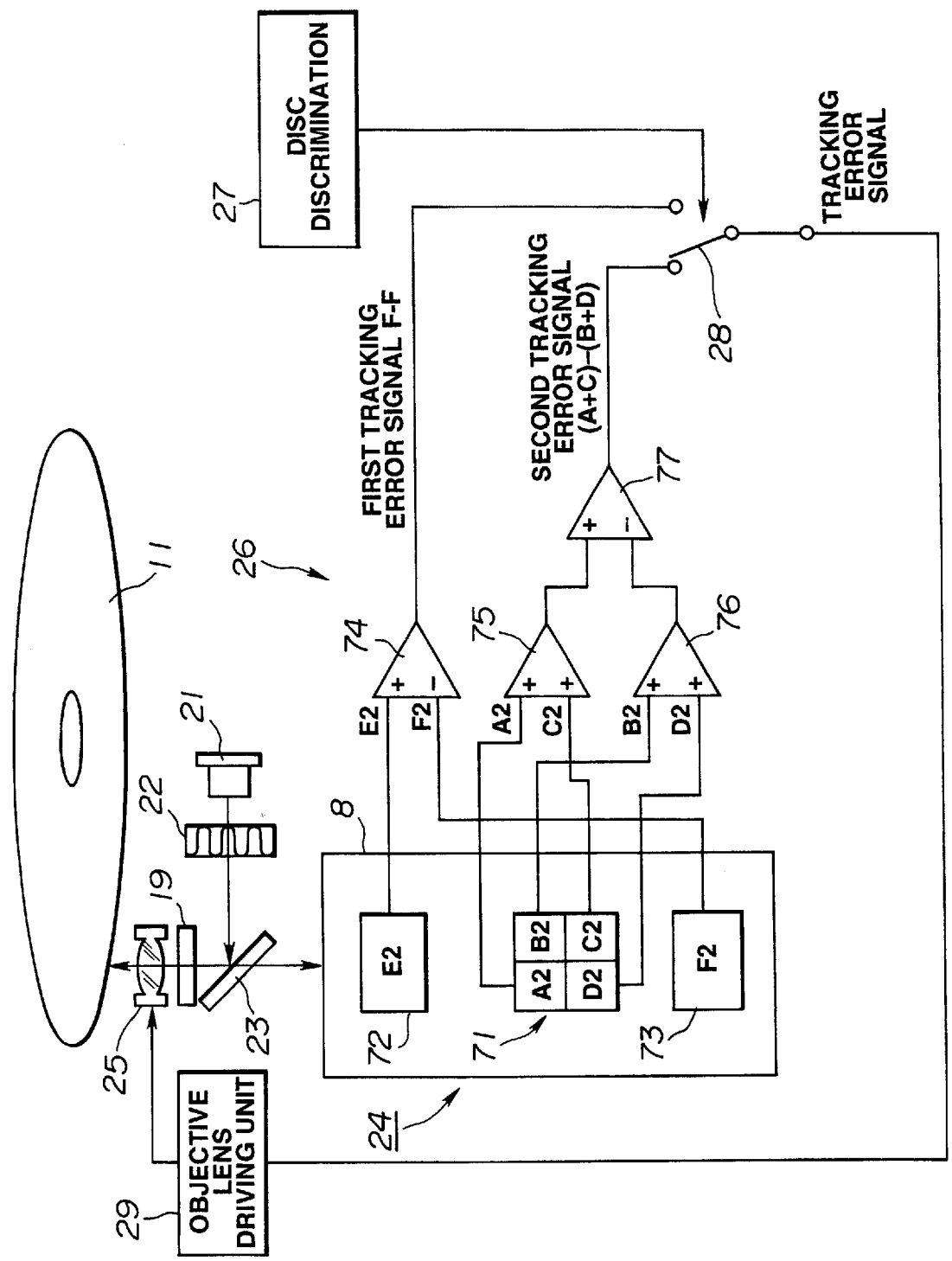
FIG. 7 illustrates a second embodiment of a tracking servo system according to the present invention.

FIG. 7 shows a second embodiment of tracking servo for recording or reproducing plural discs having different track pitches. The optical disc recording and/or reproducing apparatus in the present second embodiment is similar to that of the first embodiment except for the structures of the light receiver 24 and the signal detector 26.

The light receiver 24 has first to third light receivers 71 to 73 for receiving the three light beams split by the diffraction grating 22 and reflected by the optical disc 11. The first light receiver 71 receives the main beam (0-order light) of the three split light beams and is divided into four areas of A2, B2, C2 and D2. The second and third light receivers 72, 73 receive two side beams (±1 order light beams) of the three split light beams and have portions E2, F2 for receiving the ±1 order side beams of the three split light beams.

Of the outputs of the light receivers 71 to 73, the outputs of the light receivers 72 and 73, that is the outputs of the areas E2 and F2, are supplied to a comparator 74 where a difference output E–F, that is the first tracking error signal, is produced. Of the outputs of the first light receiver 71, the outputs of the areas A2 and C2 are summed by an adder 75, while the outputs of the areas B2 and D2 are summed by an adder 76. The phase differences of the outputs of the adders 75, 76 are compared by a phase comparator 77 to produce the second tracking error signal.

If a disc is judged by the disc discrimination portion 27 to be an optical disc having a track pitch of 1.6 μm, the first tracking error signal, which is a difference output from the comparator 74, is selected. If a disc is judged to be an optical disc having a track pitch of 0.8 μm, the second tracking error signal, which is a difference output from the comparator 77, is selected.

In the second embodiment, similarly to the first embodiment, a three-beam method is applied for reproducing, for example, a compact disc, while a phase difference based tracking error detection system, advantageous for removing the offset, is applied for recording or reproducing a high recording density optical disc.

Figure 8:
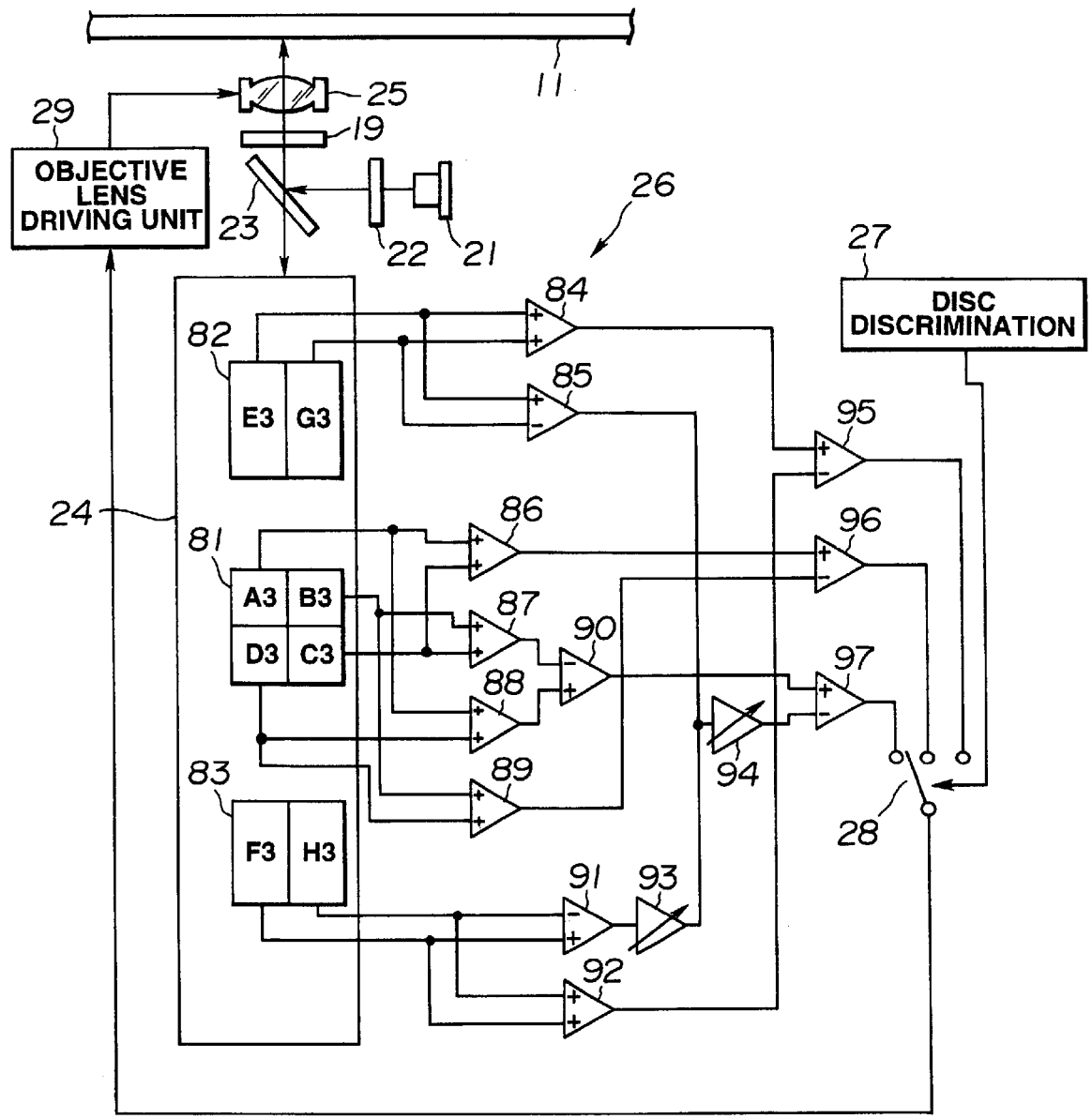
FIG. 8 illustrates a third embodiment of a tracking servo system according to the present invention.

FIG. 8 shows a third embodiment for a tracking servo for recording or reproducing plural discs with different track pitches. The optical disc recording and/or reproducing apparatus in the present third embodiment is similar to that of the first and second embodiments except for the structures of the light receiver 24 and the signal detector 26.

The light receiver 24 has first to third light receivers 81 to 83 for receiving the three light beams split by the diffraction grating 22 and reflected by the optical disc 11. The first light receiver 81 receives the main beam (0-order light) of the three split light beams and is divided into four areas of A3, B3, C3 and D3. The second and third light receivers 82, 83 receive two side beams (±1 order light beams) of the three split light beams and have two portions each of which is divided into E3, G3 and F3, H3.

Of the outputs of the light receivers 81 to 83, the outputs E3 and G3 of the light receiver 82 and the outputs F3 and H3 of the light receiver 83 are summed by adders 84, 92, respectively. The outputs of the adders 84, 92 (E3+G3, F3+H3) are supplied to a comparator 95 for producing a first tracking error signal.

Of the outputs of the first light receiver 81, the outputs A3, C3 are summed by an adder 86, while outputs B3 and D3 are summed by an adder 89. The phase differences of the outputs of the adders 86 and 89 are compared by a comparator 96 for producing a second tracking error signal.

The outputs E3, G3 of the light receiver 82 are sent to a comparator 85, while the outputs F3, H3 of the light receiver 83 are supplied to a comparator 91. A difference output of the comparator 85 is summed to a difference output of the comparator 91 passed through a variable gain amplifier 93 and the resulting sum output is supplied via a variable gain amplifier 94 to a comparator 97. The outputs A3, D3 of the light receiver 81 are summed by an adder 88, while the outputs B3, C3 of the light receiver 81 are summed by an adder 87. Outputs of the adders 87 and 88 are supplied to a comparator 90, an output of which is sent to a comparator 97. With an output of the comparator 97, a third tracking error signal is detected.

With the present third embodiment, the three-beam method is applied for reproducing a compact disc, for example, while the phase difference based tracking error signal detection method, advantageous for removing the offset, is applied to recording or reproduction of a high density optical disc. In addition, in the present embodiment, tracking error signal detection of the differential push-pull system is applied for recording or reproduction of, for example, a phase change type rewritable optical disc. Thus the same optical pickup may be used for recording or reproducing plural sorts of optical discs.

Figure 9:
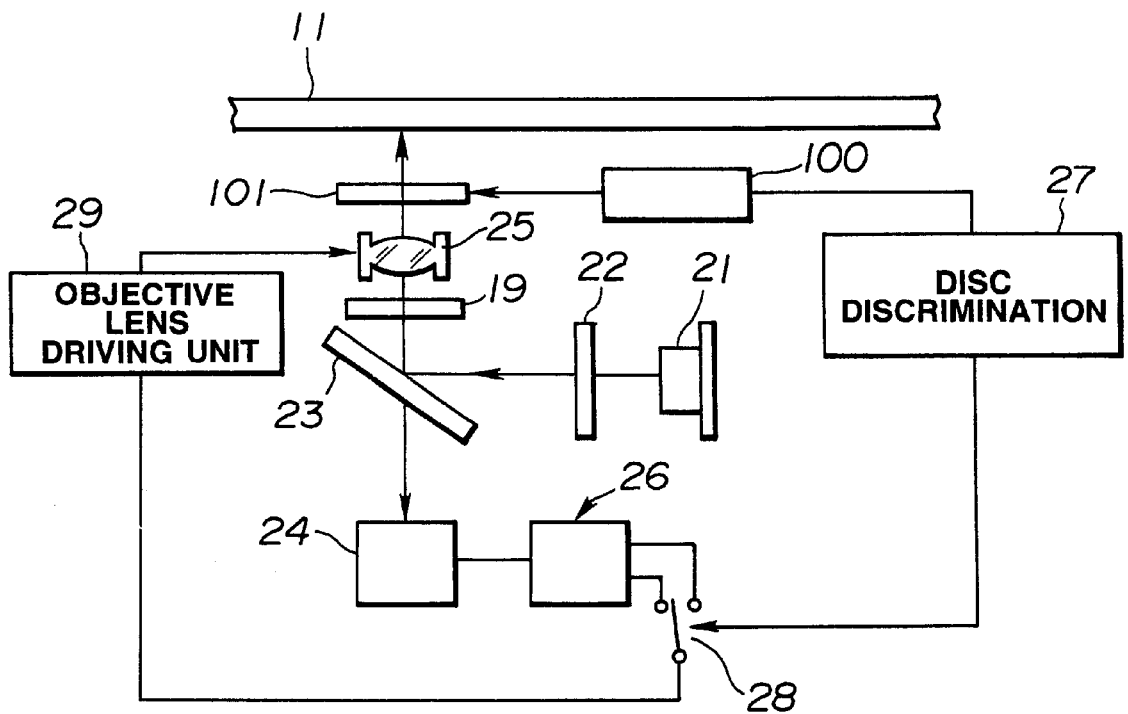
FIG. 9 illustrates a schematic structure of an optical disc recording and/or reproducing apparatus having an aperture ratio varying unit according to an embodiment of the present invention.

Next, with the optical disc recording and/or reproducing apparatus of the present invention, an optical disc with a substrate thickness of 0.6 mm may be recorded or reproduced as a first optical disc with, for example, a track pitch of approximately 0.8 μm. For such recording or reproduction, a semiconductor laser radiating a laser beam with a wavelength of, for example, 635 nm, is used as the light source 21. The objective lens 25 has an aperture ratio of, for example, 0.52. Therefore, if a second optical disc having a substrate thickness of 1.2 mm, such as a compact disc, is used, spherical aberration is generated due to errors in substrate thickness, so that correct reproduction of the recorded data cannot be achieved. Consequently, with the present embodiment of the optical disc recording and/or reproducing apparatus, the disc discrimination unit 27 sends a detection output of the optical disc both to the changeover switch 28 selecting the desired tracking error signal and to an aperture ratio variable control unit 100, as shown in FIG. 9.

Figure 10A:
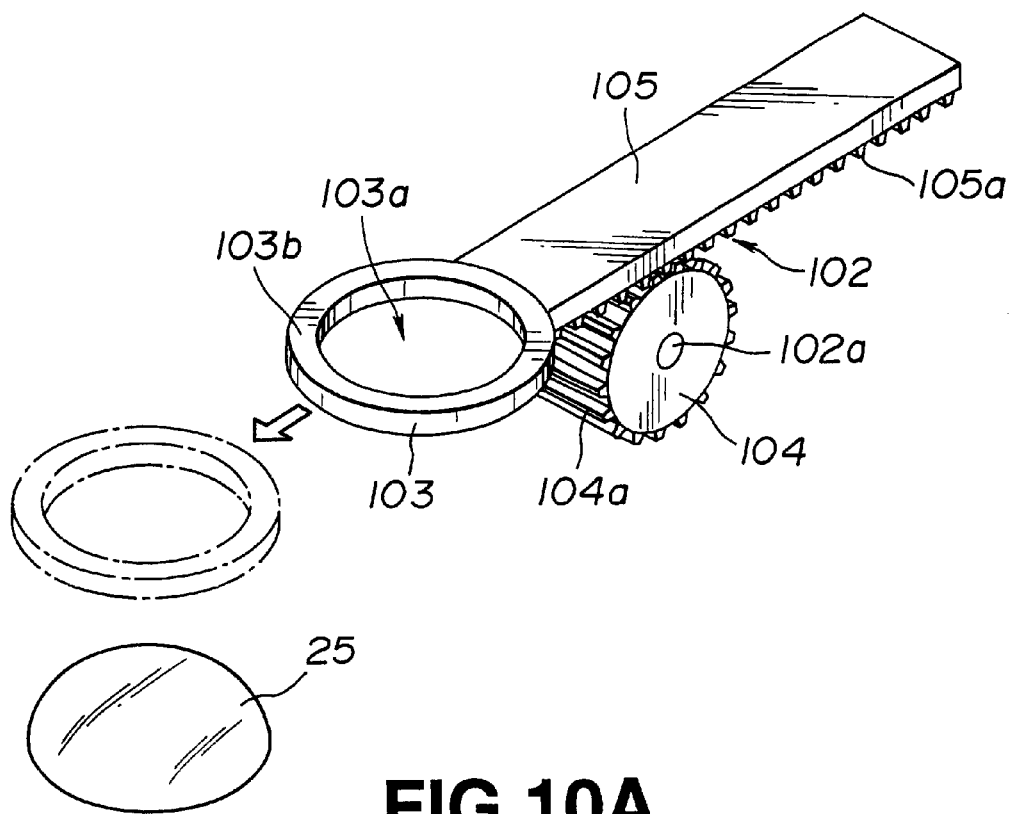
FIGS. 10A and 10B are perspective views showing a light shielding ring used as the aperture ratio varying unit of FIG. 9 and a movement mechanism for the light shielding ring.
Figure 10B:
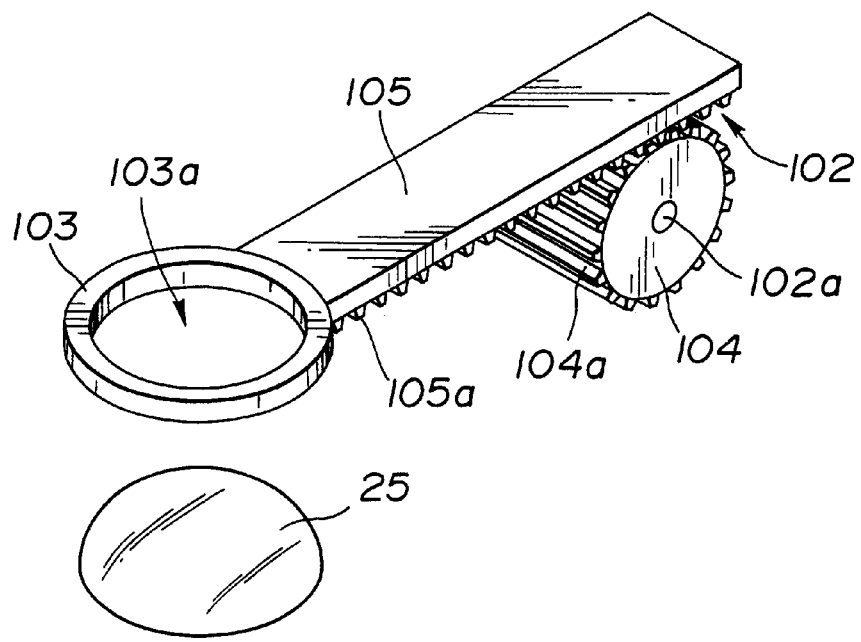
Figure 11A:
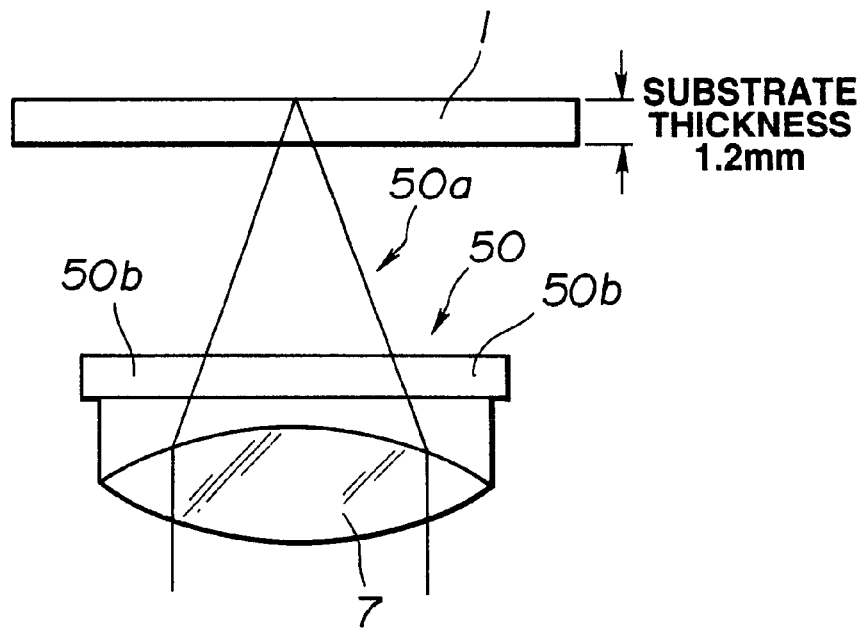
FIGS. 11A, 11B show the manner in which the aperture ratio is varied by the light shielding ring shown in FIGS. 10A and 10B.

If fed with a detection output specifying a first optical disc with a substrate thickness of 1.2 mm, the aperture ratio variable control unit 100 forms a corresponding motor driving pulse and routes the pulse to a stepping motor 102 of a variable ratio varying unit 101 shown in FIG. 10a. This rotates the stepping motor 102 in a direction of moving a light shielding ring 103 into a light path of the laser beam, so that the rotary force of the stepping motor 102 is transmitted via a gear portion 105a meshing with a gear 104a of a rotary gear 104 to a ring slider 105. Thus the light shielding ring 103 is controlled to be moved over the objective lens 25 along with the ring slider 105 as shown in FIG. 10B. The light shielding ring 103 thus shields a portion of the laser beam radiated from the objective lens 25 by its light shielding portion 103b for varying the aperture ratio of the objective lens 25 to 0.37 (corresponding to 70% of the aperture ratio of 0.52) for the first optical disc. The shielded portion of the laser beam is by the outer peripheral portion and corresponds to 30% of the entire laser beam. Thus, during reproduction of the second optical disc, the light shielding ring 103 is controlled to be moved over the objective lens 25 so that a portion of the laser beam from the objective lens 25 is shielded as the laser beam is illuminated on the second optical disc, as shown in FIG. 11a. This prohibits spherical aberration from being produced during reproduction of the optical disc having a substrate of an increased thickness due to errors in the substrate thicknesses.

Figure 12:
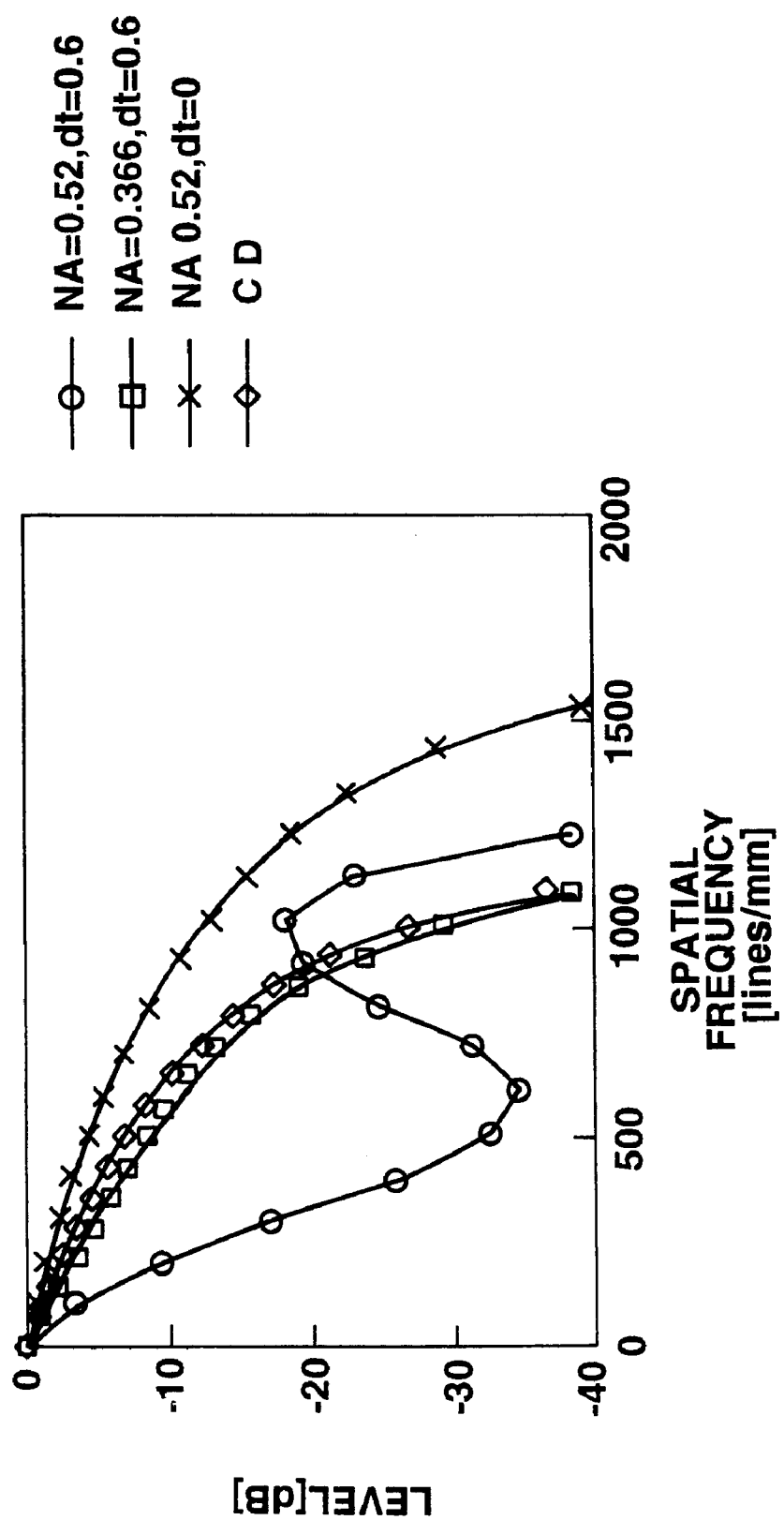
FIG. 12 is a graph showing the relation between the aperture ratio of the objective lens and the spatial frequency.

Specifically, if the second optical disc having the objective lens 25 with the aperture ratio kept at 0.52 is reproduced, wavefront aberration of approximately 0.3 rms$\lambda$ is produced due to substrate thickness error of 0.6 mm, thus producing significant distortion in the spatial frequency characteristics, as indicated by circle marks ○ in the graph of FIG. 12. Conversely, if the aperture ratio of the objective lens 25 is controlled to 0.37 by the light shielding ring 103, the wavefront aberration is decreased to approximately 0.07 rms$\lambda$, thus eliminating the distortion in the spatial frequency characteristics, as shown by □ marks in the graph of FIG. 12. Meanwhile, marks ◇ indicate spatial frequency characteristics in case reproduction is performed using the optical system dedicated to the second optical disc. Comparison of the marks ◇ and □ reveals that the two characteristics are similar to each other at approximately 1100/mm. If the aperture ratio of the objective lens 25 is controlled by the light shielding ring 103 to 0.37, the spherical aberration may be decreased to a fourth power of the aperture ratio, that is about 25%, as compared to the spherical aberration generated on reproducing the second objective lens with the aperture ratio of the objective lens 25 remaining unchanged at 0.52. Thus it becomes possible to sufficiently reproduce the second optical disc having the substrate thickness different from that of the first disc using the optical system for the first optical disc.

Figure 11B:
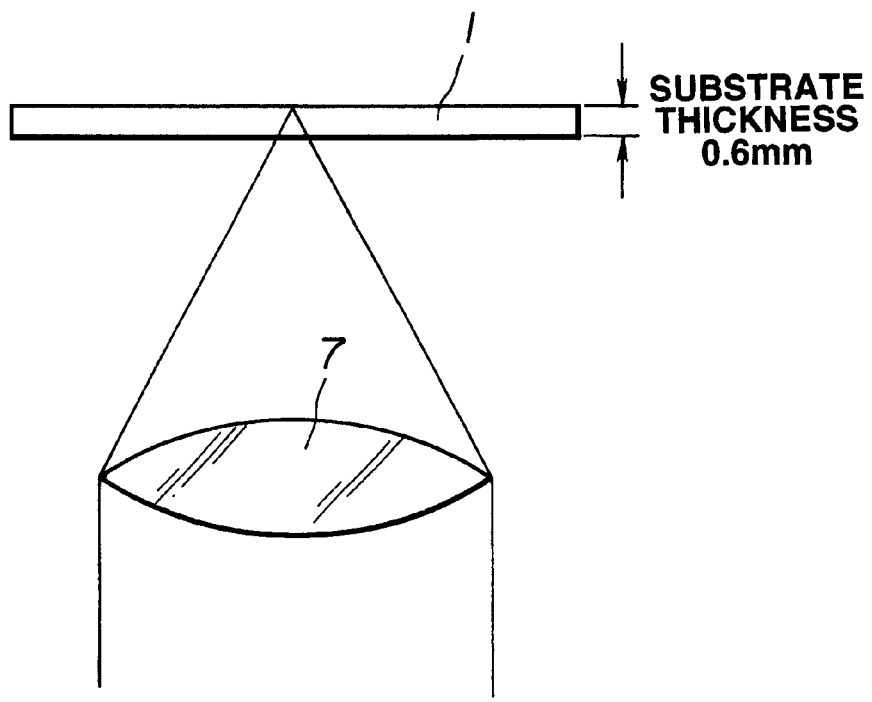

If fed with a detection output specifying a first optical disc with a substrate thickness of 0.6 mm, the aperture ratio variable control unit 100 forms a corresponding motor driving pulse and routes the pulse to the stepping motor 102 of a variable ratio varying unit 101 shown in FIG. 10A. This rotates the stepping motor 102 in a direction of moving the light shielding ring 103 out of the light path of the laser beam, so that the rotary force of the stepping motor 102 is transmitted via the gear 105a meshing with the gear portion 104a of the rotary gear 104 to the ring slider 105. Thus the light shielding ring 103 is moved away from the objective lens 25 along with the ring slider 105. Thus the laser beam from the objective lens 25 may be illuminated on the first optical disc with the substrate thickness of 0.6 mm, without being shielded, as shown in FIG. 11B. In this case, the wavelength of the laser beam is 635 nm, and the aperture ratio of the objective lens 25 is 0.52, so that the spatial frequency is equal to 1500/mm, as shown by marks x in FIG. 12, and hence the first optical disc having a small recording pit size can be reproduced satisfactorily.

It is seen from the foregoing that, with the optical disc recording and/or reproducing apparatus according to the present invention, the light shielding ring 103, shielding a portion of a laser beam from the objective lens 25, is provided in the optical system for the first optical disc having the substrate thickness of 0.6 mm, and is used only for reproduction of the second optical disc having the substrate thickness of 1.2 mm for shielding a portion of the laser beam radiated from the objective lens 25 for variably controlling the aperture ratio of the objective lens 25 for conformity to the second optical disc for enabling reproduction of the two different sorts of the optical disc having different substrate thicknesses. Since the two sorts of the optical discs with different substrate thicknesses may be reproduced in this manner, the optical disc reproducing apparatus may be improved in universality in application.

A second embodiment of the present invention concerning the varying of the aperture ratio in the optical disc recording and/or reproduction according to the present invention is now explained. In the previous first embodiment, the aperture ratio of the objective lens 25 is variably controlled by the light shielding ring 103 and the ring slider 105. In the present second embodiment of the optical disc recording and/or reproducing apparatus, a pair of light shielding plates 106, 109 as shown in FIG. 13 are used for shielding a portion of the laser beam from the objective lens 25, using a pair of light shielding plates 106, 109 as shown in FIG. 13, for variably controlling the aperture ratio of the objective lens 25.

Except for the mechanism related with this construction, the optical disc recording and/or reproducing apparatus of the preset second embodiment is similar in structure to the optical disc recording and/or reproducing apparatus of the previous first embodiment, only the above mechanism is explained in connection with the optical disc recording and/or reproducing apparatus of the preset second embodiment, while detailed description of the remaining portion is omitted for clarity.

Figure 13:
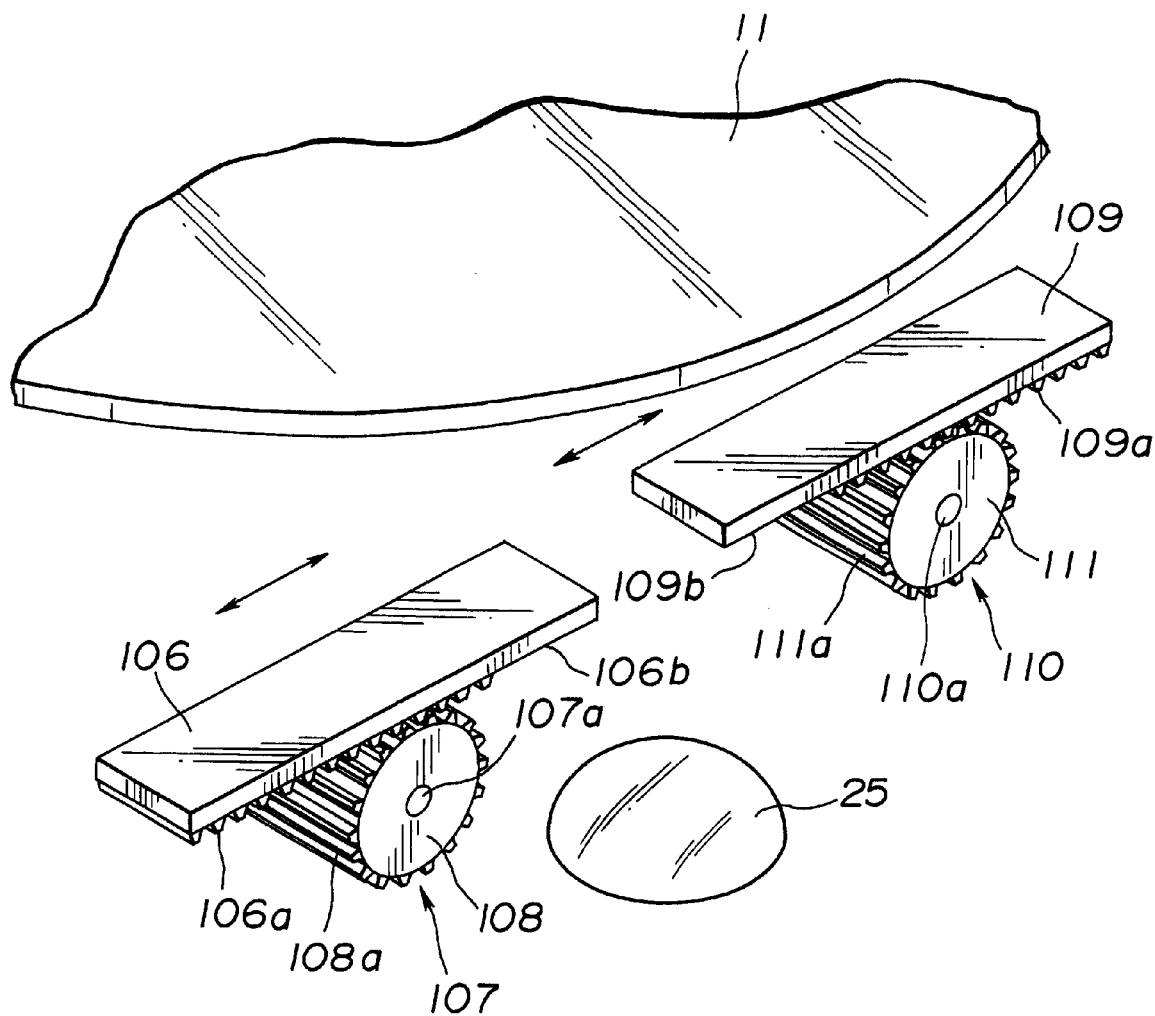
FIG. 13 is a perspective view showing a light shielding plate used as the aperture ratio varying unit of FIG. 9 and a movement mechanism for the light shielding plate.

The aperture ratio varying unit 101, provided in the present second embodiment of the optical disc recording and/or reproducing apparatus, is made up of stepping motors 107, 110 for controlling the movement of the light shielding plates 106, 109, as shown in FIG. 13.

The light shielding plates 106, 109 are arranged on a straight line perpendicular to a laser beam radiated from the objective lens 25 so that the ends of the plates face each other. Parts of the bottom surface portions consecutive to the facing ends of the light shielding plates 106, 109 are designed as light shielding portions 106B, 109B for shielding a portion of the laser beam radiated from the objective lens 25. The bottom sides of the light shielding plates 106, 109 are provided with rack gears 106a, 109a, respectively. These rack gear portions 106A, 109A are designed to mesh with gear portions 108a, 11a of rotary shafts 107a, 110a of the stepping motors 107, 110, respectively.

The above-described structure of the aperture ratio varying unit 101 is controlled to be driven by a motor driving pulse supplied from the aperture ratio varying controlling unit 100 responsive to a detection output of the disc discrimination unit 27. That is, if fed from the disc discrimination unit 27 with a detection output specifying the presence of the first optical disc having a substrate thickness of 1.2 mm, the aperture ratio variable control unit 100 generates motor driving pulses for rotating the stepping motors 107, 110 in a direction of reducing the gap delimited between the facing ends of the light shielding plates 106, 109. This drives the stepping motors is transmitted via the gear portions 106a, 109a of the light shielding portions 106, 109. The light shielding plates 106, 109 are controlled to be moved for hiding part of the objective lens 25. The range of hiding of the objective lens 25 by the light shielding plates 106, 109 is set to a range which will give an aperture ratio of the objective lens 25 of 0.37 equal to the aperture ratio for the second objective lens 25. By controlling the movement of the light shielding portions 106b, 109b of the light shielded plates 106, 109 for setting the aperture ratio of 0.37 of the objective lens 25. Thus, the second optical disc with the substrate thickness of 1.2 mm may be reproduced correctly, as in the first embodiment described above.

Next, if fed from the disc discrimination circuit 27 with a presence output specifying the reproduction of the first optical disc having the substrate thickness of 0.6 mm, the aperture ratio variable control unit 100 generates motor driving pulses for rotating the stepping motors 107, 110 in a direction of enlarging the gap delimited between the facing ends of the light shielding plates 106, 109. The motor driving pulses are supplied to the stepping motors 107, 110. This drives the stepping motors 107, 110 into rotation. The rotational force of the stepping motors is transmitted via the gear portions 108a, 111a of the gears 108, 111 to the rack gear portions 106a, 109, of the light shielding portions 106, 109. The light shielding plates 106, 109 are controlled to be moved to positions not shielding the laser beam radiated from the objective lens 25. This gives the aperture ratio of the objective lens 25 of 0.52 which is equal to the aperture ratio for the first optical disc. Thus the first optical disc may be reproduced correctly.

Figure 14:
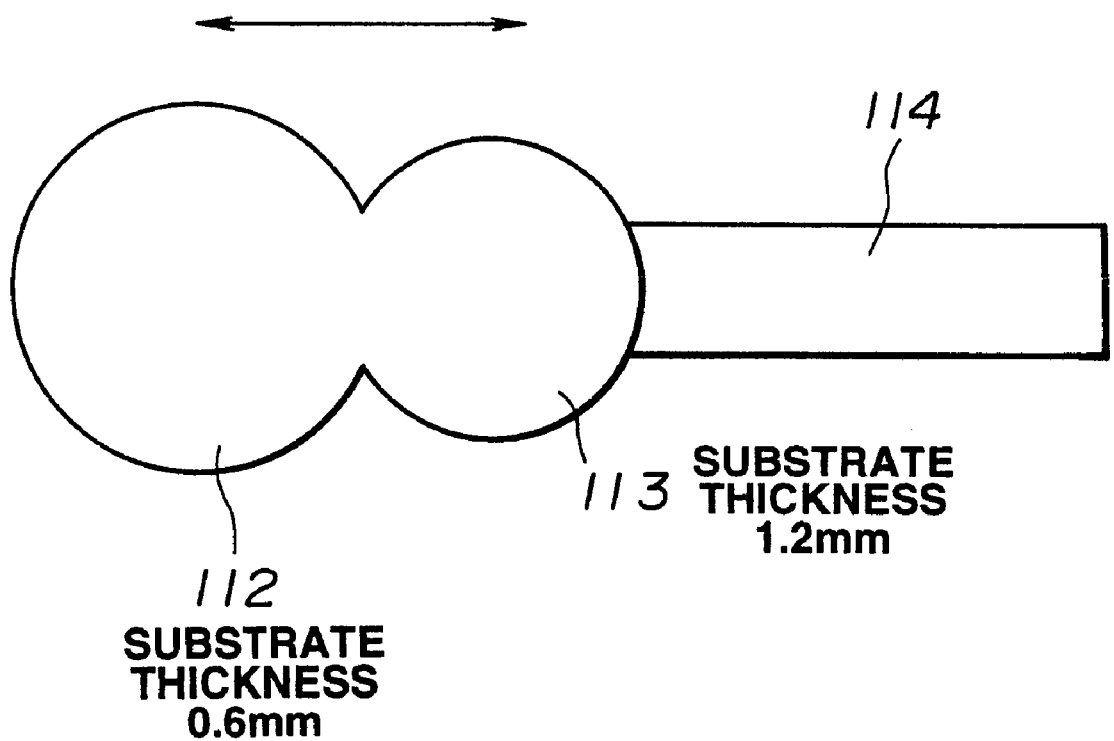
FIG. 14 illustrates an objective lens and a movement mechanism for the objective lens, in which the objective lens has lens portions having different aperture ratios and used as the aperture ratio varying unit of FIG. 9.

A third embodiment of the present invention concerning the varying of the aperture ratio in the optical disc recording and/or of reproduction according to the present invention is now explained. With the optical disc recording and/or reproducing apparatus according to the present third embodiment, an objective lenses having two different aperture ratios as shown in FIG. 14 is employed in place of the objective lens 25 and the aperture ratio variable control unit 101 and the objective lens having the aperture ratio corresponding to the substrate thickness of the optical disc being reproduced is used by switching. Since the optical disc recording and/or reproducing apparatus of the present third embodiment is similar in structure to the optical disc reproducing apparatus of the first and second embodiments except the objective lens, the following description of the third embodiment is centered about the objective lens, while explanation of the remaining portions is not made for clarity.

That is, the above objective lens has a first light condensing portion 112 having an aperture ratio (0.52) for the first optical disc having the substrate thickness of 0.6 mm and an aperture ratio (0.37) for the second optical disc having the substrate ratio (0.37) for the second optical disc having the substrate thickness of 1.2 mm. The objective lens has a slider 114 for moving the objective lens on path of the laser beam. The bottom portion of the slider 114 has a rack gear meshing with a rotating gear formed on the stepping motor. The force of rotation of the stepping motor is transmitted via the rotating gear and the rack gear to the slider 114 for controlling movement of the objective lens. If fed with a detection output from the disc discrimination unit 27 with a detection output specifying the presence of the first optical disc with the substrate thickness of 0.6 mm, the aperture ratio variable control unit 100 supplies a motor driving pulse to the stepping motor for controlling movement of the first light condensing portion 112 onto the light path of the laser beam. This drives the stepping motor into rotation so that the first light condensing portion 112 of the objective lens is moved by the slider 114 on the light path of the laser beam. Since the first light condensing portion 112 has the aperture ratio of 0.52 for the first optical disc, the first optical disc may be correctly reproduced by controlling the movement of the first light condensing portion 112 in the light path of the laser beam.

If fed with a detection output from the discrimination unit 27 with a detection output specifying the presence of the second optical disc with the substrate thickness of 1.2 mm, the aperture ratio variable control unit 100 supplies the motor driving pulse to the stepping motor for controlling movement of the second light condensing portion 113 onto the light path of the laser beam. This drives the stepping motor into rotation so that the second light condensing portion 113 of the objective lens is moved by the slider 114 on the light path of the laser beam. Since the second light condensing portion 113 has the aperture ratio of 0.37 for the second optical disc, the second optical disc may be correctly reproduced by the movement of the second light condensing portion 113 in the light path of the laser beam.

In the above embodiments, the aperture ratio is variably controlled for the first and second optical discs having different substrate thicknesses. However, since it is sufficient in the case of the light shielding plates 106, 109 shown in FIG. 13 to variably control the laser beam light shielding range depending on the substrate thickness of the optical disc, it is possible to variably control three or more aperture ratios of the light shielding ranges of the objective lens for enabling reproduction of three or more optical discs having different substrate thicknesses. In the embodiment of FIG. 14 of an objective lens having the light condensing portions 112, 113 with two different aperture ratios, light condensing portions with three or more different aperture ratios may be provided for enabling reproduction of three or more optical discs having different substrate thicknesses.

In the above description of the third embodiment, the light condensing portions 112, 113 are controlled to be moved by the slider 114. It is however possible to provide a rotary shaft between the light condensing portions 112, 113, using the shaft sliding type bi-axial mechanism shown in FIG. 1, and to control the objective lens to be rotated about the rotary shaft as the center of rotation for controlling movement of the light condensing portions 112, 113 in the light path of the laser beam.

What is claimed is:

1. A tracking servo system in an optical recording medium recording and/or reproducing apparatus comprising:
   a light source for radiating a light beam;
   a diffraction element for separating a light beam radiated from said light source into at least three beams, including a main beam and two side beams;
   an objective lens for converging the light beams separated by said diffraction element on a signal recording surface of the optical recording medium;
   a light receiving unit having a four-segment first light receiving portion for receiving said main beam reflected by the recording surface of the optical recording medium and second and third light receiving portions arranged on both sides of said first light receiving portion for receiving the side beams reflected by the recording surface of the optical recording medium;
   calculation means for finding a plurality of tracking error signals based on outputs of said first, second and third light receiving portions;
   means for discriminating the type of the optical recording medium;
   switching means for selecting one of the tracking error signals calculated by said calculation means based on a signal from said discriminating means; and
   means for driving an objective lens based on the tracking error signal selected by said switching means.

2. The tracking servo system in the optical recording medium recording and/or reproducing apparatus as claimed in claim 1 wherein said calculation means produces a first tracking error signal by calculating the phase difference between signals obtained by addition of desired two each of the four outputs of the first light receiving portion, said calculation means producing a second tracking error signal based on outputs of said second and third light receiving portions.

3. The tracking servo system in the optical recording medium recording and/or reproducing apparatus as claimed in claim 1 wherein said calculation means calculates the phase differences of signals produced by summing desired two each of four outputs of said first light receiving portion for producing a first tracking error signal, said calculation means also calculating the differences of signals from the second and third light receiving portions for producing a second tracking error signal.

4. The tracking servo system in the optical recording medium recording and/or reproducing apparatus as claimed in claim 1 wherein each of said second and third light receiving portion is a two-segment light receiving portion, said calculation means producing a first tracking error signal based on respective outputs of said first light receiving portion and also producing a second tracking error signal based on respective differential outputs of said first to third light receiving portions, said calculation means also producing a third tracking error signal from a differential output between an output of the second light receiving portion and an output of the third light receiving portion.

5. The tracking servo system as claimed in claim 1 further comprising means for varying the aperture ratio of said optical lens.

6. The tracking servo system as claimed in claim 1 wherein said objective lens has plural lens portions having different aperture ratios.

* * * * *

UNITED STATES PATENT AND TRADEMARK OFFICE
CERTIFICATE OF CORRECTION

PATENT NO.     : 6,366,543 B2
DATED          : April 2, 2002
INVENTOR(S)    : Kamon Uemura It is certified that error appears in the above-identified patent and that said Letters Patent is hereby corrected as shown below:

Column 12,
Line 22, delete "recording".
Line 33, delete "recording".
Line 42, delete "recording".

Signed and Sealed this

Tenth Day of December, 2002

JAMES E. ROGAN
*Director of the United States Patent and Trademark Office*